(12) United States Patent
Monestier (10) Patent No.: US 12,264,810 B2
(45) Date of Patent: Apr. 1, 2025

(54) LIGHTING DEVICE AND A METHOD OF MANUFACTURING A LIGHTING DEVICE

(71) Applicant: LUMILEDS LLC, San Jose, CA (US)

(72) Inventor: Florent Monestier, Aachen (DE)

(73) Assignee: LUMILEDS, LLC, San Jose, CA (US)

( * ) Notice: Subject to any disclaimer, the term of this patent is extended or adjusted under 35 U.S.C. 154(b) by 210 days.

(21) Appl. No.: 17/926,511

(22) PCT Filed: May 18, 2021

(86) PCT No.: PCT/US2021/032996
§ 371 (c)(1),
(2) Date: Nov. 18, 2022

(87) PCT Pub. No.: WO2021/236662
PCT Pub. Date: Nov. 25, 2021

(65) Prior Publication Data
US 2023/0280021 A1  Sep. 7, 2023

Related U.S. Application Data (60) Provisional application No. 63/026,455, filed on May 18, 2020.

(30) Foreign Application Priority Data

Jul. 23, 2020  (EP) ..................................... 20187328

(51) Int. Cl.
*F21V 23/00* (2015.01)
*B60Q 1/02* (2006.01)
(Continued)

(52) U.S. Cl.
CPC .............. *F21V 23/005* (2013.01); *B60Q 1/02* (2013.01); *F21K 9/237* (2016.08); *F21V 29/74* (2015.01); *F21Y 2115/10* (2016.08)

(58) Field of Classification Search
CPC ...... F21V 23/00; F21V 23/005; F21V 23/006; F21V 29/70; F21V 29/74; F21V 29/508;
(Continued)

(56) References Cited

U.S. PATENT DOCUMENTS

| 10,448,503 B1* | 10/2019 | Emerson | .................. H05K 1/18 |
| 2005/0207176 A1* | 9/2005 | Johnson | ............... B60Q 1/2696 362/545 |

(Continued)

FOREIGN PATENT DOCUMENTS

| EP | 3101331 A1 | 12/2016 |
| JP | 2009-289750 A | 12/2009 |

OTHER PUBLICATIONS

International Preliminary Report on Patentability Chapter I issued Nov. 17, 2022 for PCT International Application No. PCT/US2021/032996.

(Continued)

*Primary Examiner* — Thai Pham
(74) *Attorney, Agent, or Firm* — Volpe Koenig (57) ABSTRACT

A lighting device and a method of manufacturing a lighting device are described. The lighting device includes a heat sink having a mounting area. A main board is mounted to the mounting area of the heat sink, the main board including a recess. A light-emitting diode (LED) assembly is mounted to the mounting area within the recess of the main board. The LED assembly includes at least one emitter. Electrical circuitry is disposed on the top surface of the main board, which is configured to control the at least one emitter of the LED assembly. An electrical connection is provided between the LED assembly and the electrical circuitry.

20 Claims, 10 Drawing Sheets

(51) Int. Cl.
*F21K 9/237* (2016.01)
*F21V 29/74* (2015.01)
*F21Y 115/10* (2016.01)

(58) Field of Classification Search
CPC .......... F21S 41/00; F21S 41/10; F21S 41/141; F21S 41/192; F21S 45/47; B60Q 1/02; B60Q 1/04; B60Q 1/0088; B60Q 1/2696; F21K 9/20; F21K 9/237; F21K 9/238; F21Y 2115/00
See application file for complete search history.

(56) References Cited

U.S. PATENT DOCUMENTS

| | | | |
|---|---|---|---|
| 2006/0145180 A1* | 7/2006 | Galli | F21V 29/83 |
| | | | 257/E33.058 |
| 2009/0154160 A1 | 6/2009 | Li et al. | |
| 2011/0090691 A1* | 4/2011 | Markle | H05K 1/021 |
| | | | 362/249.02 |
| 2011/0103076 A1* | 5/2011 | Beck | F21V 29/89 |
| | | | 362/372 |
| 2012/0033429 A1 | 2/2012 | Van de Ven | |
| 2012/0313526 A1* | 12/2012 | Lee | F21K 9/00 |
| | | | 315/113 |
| 2013/0039072 A1* | 2/2013 | Kim | F21V 23/02 |
| | | | 362/373 |
| 2014/0264406 A1 | 9/2014 | Muehlbacher et al. | |
| 2016/0149088 A1* | 5/2016 | Yan | H05B 45/22 |
| | | | 257/48 |
| 2019/0008045 A1* | 1/2019 | Iedema | H05K 1/141 |
| 2019/0368676 A1 | 12/2019 | Lee | |

OTHER PUBLICATIONS

Extended European Search Report dated Jan. 27, 2021 for European Patent Application No. 20187328.8.
International Search Report and Written Opinion mailed Sep. 7, 2021 for PCT International Application No. PCT/US2021/032996.
Extended European Search Report dated Sep. 25, 2024 for European Patent Application No. 21807950.7.

* cited by examiner

LIGHTING DEVICE AND A METHOD OF MANUFACTURING A LIGHTING DEVICE

CROSS REFERENCE TO RELATED APPLICATIONS

This application is a § 371 application of International Application No. PCT/US2021/032996, filed May 18, 2021, which claims the benefit of U.S. Provisional Application Ser. No. 63/026,455, filed on May 18, 2020, and European Application Serial No. EP 20187328.8, filed Jul. 23, 2020, the contents of which are hereby incorporated by reference herein.

BACKGROUND

LED light sources are used more and more in lighting applications due to inherent advantages such as long lifetime, energy efficiency, and small size. LED light sources often comprise integrated components such as an electrical connector, a sealing, a heat sink, and optical elements. As these LED light sources are widely used, for example, in automotive lighting, there is a high market demand and a great number of standardized and non-standardized LED light sources is used.

SUMMARY

A lighting device and a method of manufacturing a lighting device are described. The lighting device includes a heat sink having a mounting area. A main board may be mounted to the mounting area of the heat sink, the main board including a recess. A light-emitting diode (LED) assembly may be mounted to the mounting area within the recess of the main board. The LED assembly may include at least one emitter. Electrical circuitry may be disposed on the top surface of the main board, which may be configured to control the at least one emitter of the LED assembly. An electrical connection may be provided between the LED assembly and the electrical circuitry.

BRIEF DESCRIPTION OF THE DRAWINGS

A more detailed understanding can be had from the following description, given by way of example in conjunction with the accompanying drawings wherein.

DETAILED DESCRIPTION OF THE PREFERRED EMBODIMENTS

Examples of different lighting devices and methods of manufacturing lighting devices will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

In the embodiments described herein, a lighting device and a method of manufacturing a lighting device are described. The lighting device may include a heat sink having a mounting area. A main board may be mounted to the mounting area, and may include a recess. A light-emitting diode (LED) assembly may also be mounted to the mounting area within the recess. The LED assembly may include at least one emitter. Electrical circuitry may be disposed on the top surface of the main board, which may be configured to control the at least one emitter of the LED assembly. An electrical connection may be provided between the LED assembly and the electrical circuitry.

The lighting device and method of manufacturing the lighting device described herein provide flexibility in that they allow combining of an appropriate main board with a suitable LED assembly. The main board and the LED assembly may be manufactured separately and mounted on the heat sink late in the manufacturing process. In the event of a defect, only the defective part may be replaced, such as only the main board or only the LED assembly. In addition, the recess (where included) may enable both of the separately manufactured parts, that is, the main board and the LED assembly, to be in contact with the heat sink, rather than, for example, the LED assembly mounted on the main board. Hereby, the LED assembly and the main board may be in direct contact with the heat sink which may optimize thermal coupling and heat dissipation.

Figure 1:
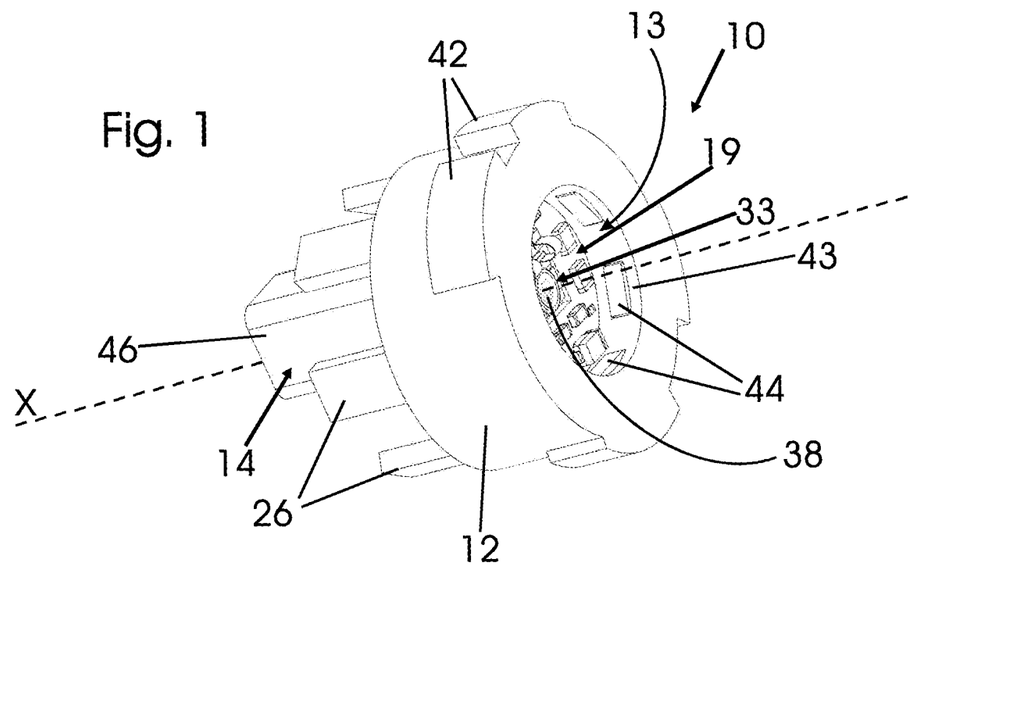
FIG. 1 is a perspective view of a first embodiment of the lighting device.
Figure 2:
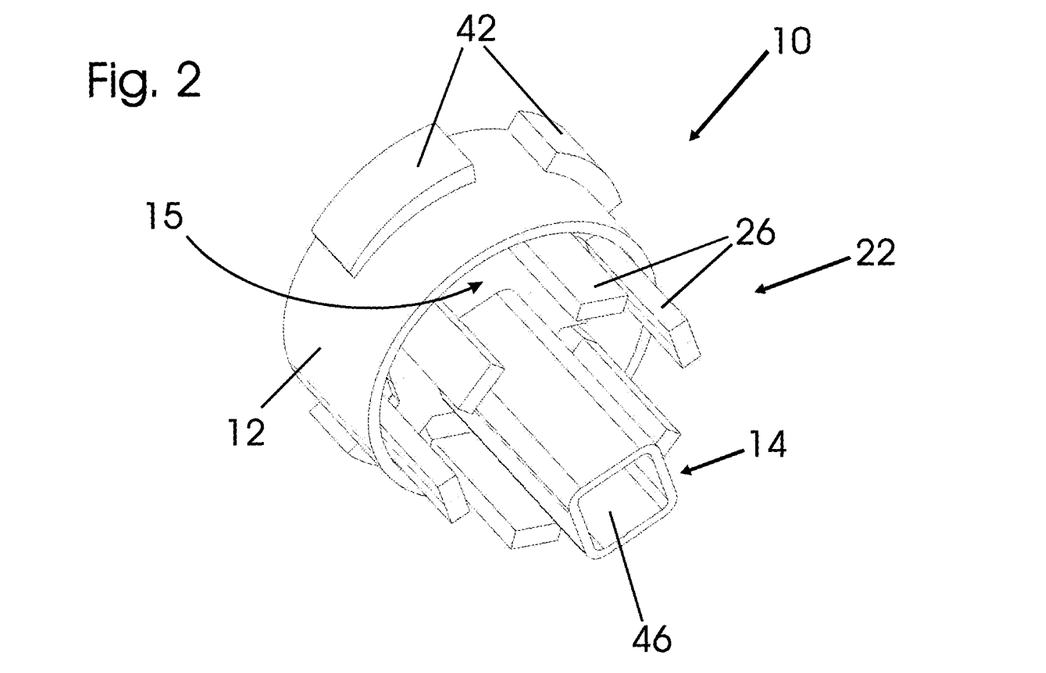
FIG. 2 is another perspective view of the first embodiment of the lighting device.
Figure 3:
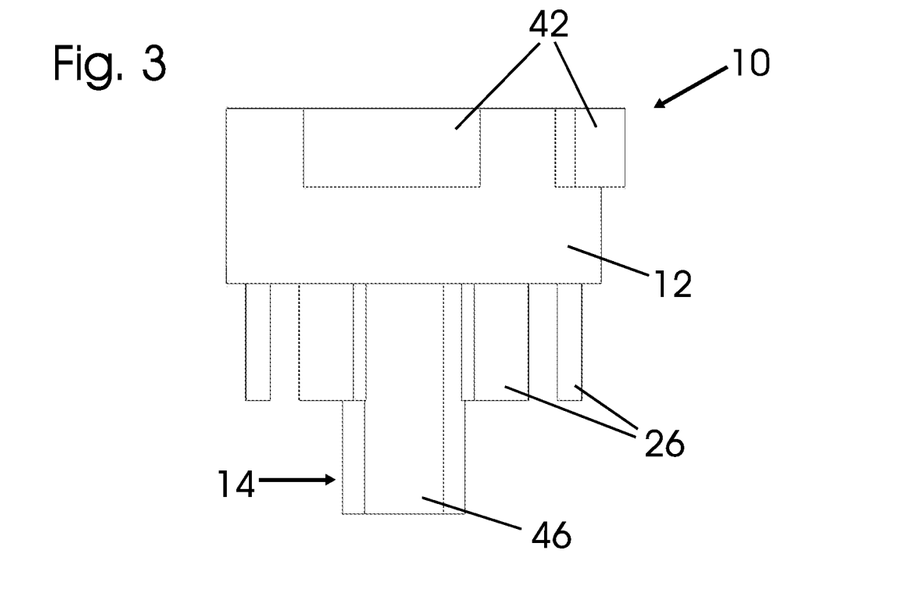
FIG. 3 is a side view of the lighting device of FIG. 1.

Referring now to FIGS. 1, 2 and 3, there is shown a first embodiment of a lighting device 10. The lighting device 10 may comprise a cylindrical housing part 12 with a top aperture 13.

Within the top aperture 13, an electrical circuit 19 comprising an LED unit 33 with a light emitting surface 38 may be arranged from which light may be emitted into a forward direction along an optical axis X.

At the opposite side, the cylindrical housing part 12 may comprise a back aperture 15. Circularly arranged heat fins 26 of a heat sink 22 may protrude out of the back aperture 15. The back of the heat sink 22 may be covered by a back housing part 14, which may comprise a plug housing 46, which may be centered in the middle of the heat fins 26.

The cylindrical housing part 12 may include alignment protrusions 42 arranged at the circumference to position and align the lighting device 10 within a holder, such as a signal light of a car.

Figure 4:
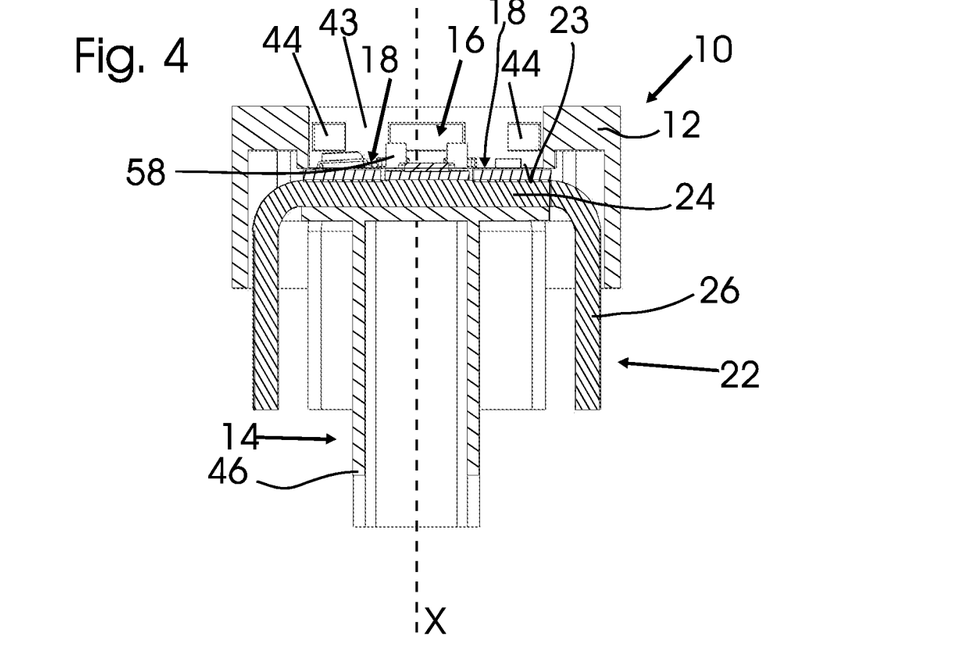
FIG. 4 is a sectional view of the lighting device of FIG. 1.
Figure 5:
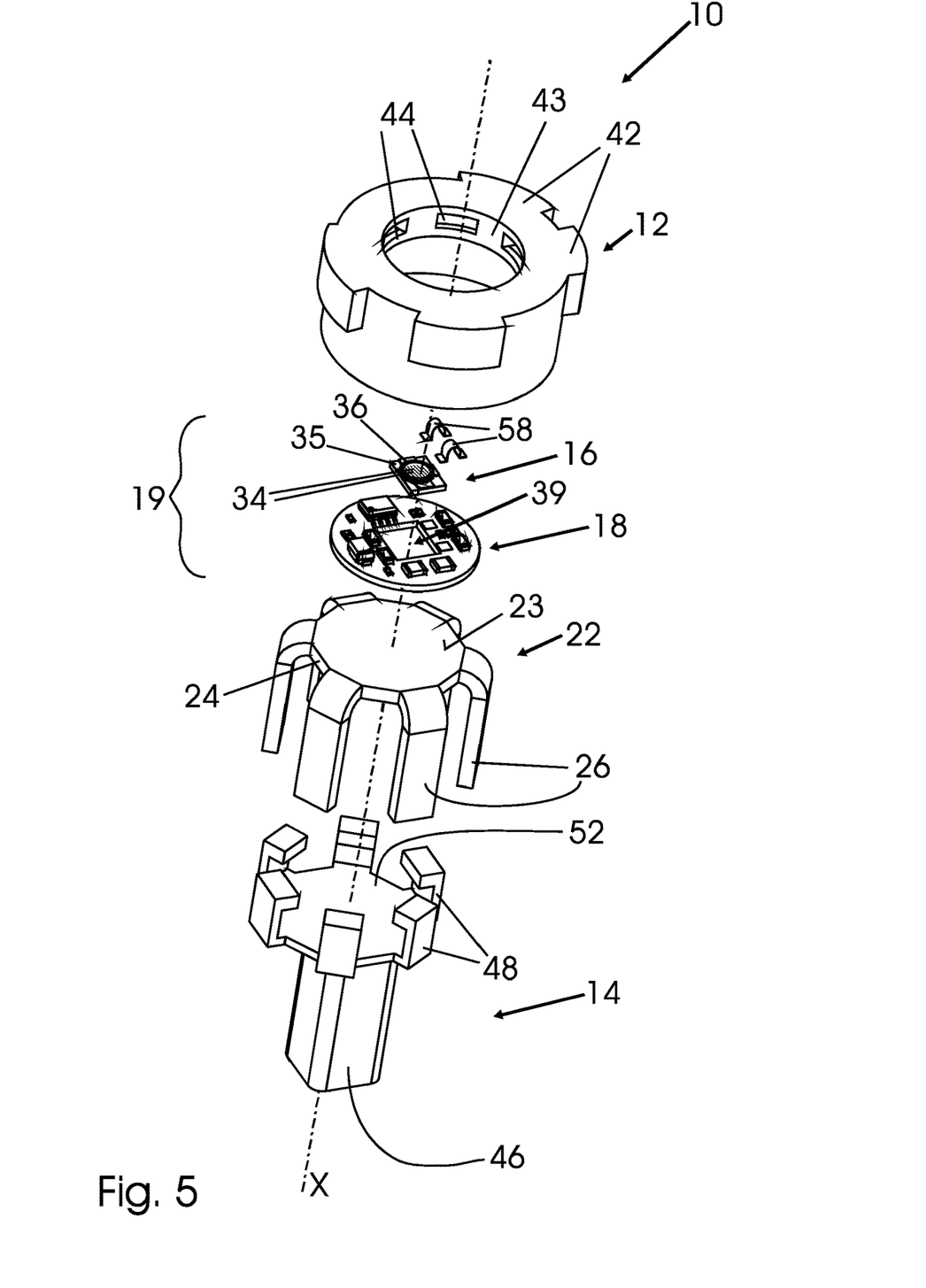
FIG. 5 is an exploded perspective view of the lighting device of FIGS. 1-4.

As shown in FIGS. 4, 5, the heat sink 22 may include a plate portion 24 from which the heat fins 26 extend. The plate portion 24 may be arranged perpendicular to the optical axis X. The heat fins 26 may project from the plate portion 24 into a back direction in parallel to the optical axis X. The heat fins 26 may be spaced apart from each other and may provide a free space between each two heat fins 26. The plate portion 24 and the heat fins 26 of the heat sink 22 may be formed in one piece out of a bent copper or aluminum sheet material.

The plate portion 24 of the heat sink 22 may be provided at the top of a mounting area 23 for the electrical circuit 19.

Figure 7:
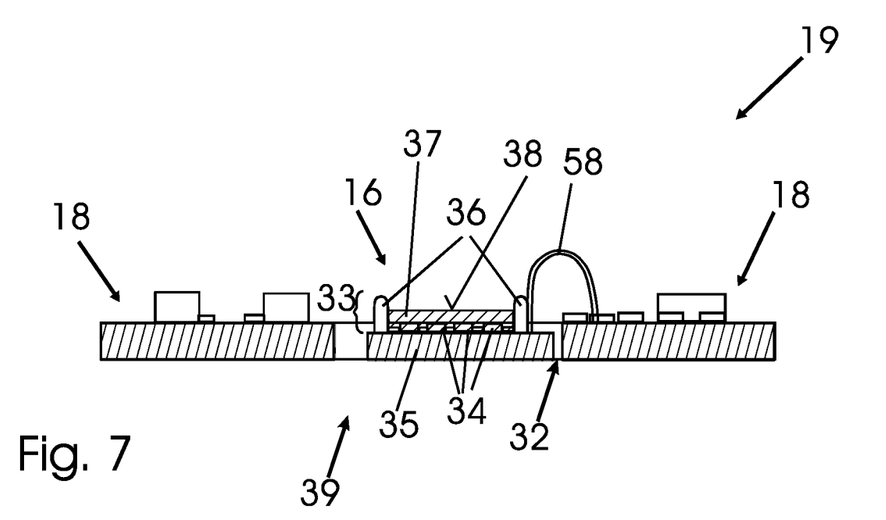
FIG. 7 is a side view in section of the boards of the lighting device of FIG. 1.

The electrical circuit 19 is shown more detailed in FIG. 7. The electrical circuit 19 may comprise a rectangular LED assembly 16 and a main board, which may be a driver board 18.

The LED assembly 16 may comprise an LED board 35 with the LED unit 33 mounted on top. The LED unit 33 may comprise several LED elements 34, which may be surrounded by a dam 36 and may be covered by a phosphor coating 37, which may provide the light emitting surface 38. The dam 36 may also border the phosphor coating 37.

Figure 6:
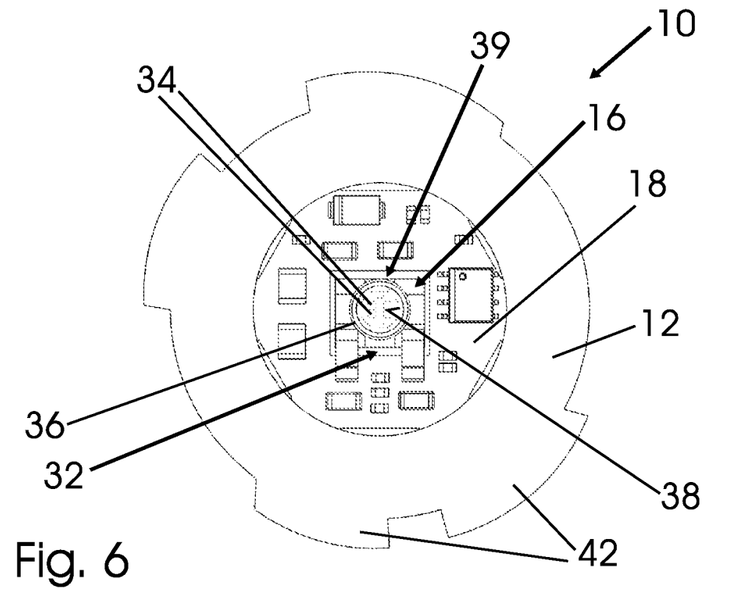
FIG. 6 is a top view of the lighting device of FIG. 1.

The driver board 18 may comprise electronic components to drive the LED unit 33, such as a power supply and components for safety. Referring now to FIG. 5, the driver board 18 may comprise a cutout 39, also referred to herein as a recess. The LED assembly 16 may be arranged within the cutout 39. As the cutout 39 may serve to provide a free area for the LED assembly 16, the shape of the cutout 39 may be rectangular analogously to the shape of the LED assembly 16, whereby the edges of the cutout 39 may be slightly longer than those of the LED assembly 16, such that there may be a gap 32 between the driver board 18 and the LED assembly 16. As shown in FIG. 6, within the cutout 39, the LED assembly 16 may be surrounded from all directions by the driver board 18 and may be situated in its center.

Referring again to FIG. 7, the separate driver board 18 and the LED assembly 16 may be electrically coupled by ribbon bonds 58 that are bridging the gap 32. Thus, the ribbon bonds 58 may serve to couple the electronic components of the driver board 18 and the LED assembly 16 as also shown in FIG. 6. The driver board 18 and the LED assembly 16 may together form the electrical circuit 19, while the electronic components may be mounted on two separately manufactured boards, coupled by the ribbon bonds 58.

The driver board 18 and the LED assembly 16 may be mounted on the mounting area 23 of the heat sink 22, as shown in FIG. 4. The driver board 18 may be circular and may have the same diameter as the plate portion 24. The cutout 39 in the driver board 18 may enable that both the driver board 18 and the LED assembly 16 may be mounted directly to the heat sink 22 to obtain superior thermal coupling. Further, the cutout 39 may enable that the LED assembly 16 may be situated in the center of the heat sink plate portion 24 and on the center of the optical axis X to achieve a symmetrical and central light beam.

As shown in FIG. 5, the back housing part 14 may comprise gripper arms 48 arranged at the circumference of a housing plate portion 52 on the top of the plug housing 46.

Assembled, the cylindrical housing part 12 and the back housing part 14 may be fixed together covering the plate portion 24 and the electrical circuit 19. The cylindrical housing part 12 and the back housing part 14 may be coupled by the gripper arms 48 that are engaged with apertures 44 within a double wall 43 of the cylindrical housing part 12. Thereby, each gripper arm 48 may traverse the heat sink 22 by extending through the free space between two heat fins 26.

In order to operate the lighting device 10, a plug connector may be plugged into the plug housing 46. An internal electrical connection (not shown) may be provided to electrically couple the plug connector within the the plug housing 46 with the driver board 18 that may be disposed to drive the LED elements 34 within the LED unit 33. The phosphor coating 37 may be exposed to the radiation of the LED elements 34 and may homogenously emit light out of the light emitting surface 38 and out of the top aperture 13. The lighting device 10 may be disposed in a holder, such as within a vehicle as a signal light.

The lighting device 10 may be manufactured by providing and assembling the heat sink 22, the LED assembly 16, the driver board 18 and the two housing parts 12, 14. The heat sink 22 may be manufactured in one piece by a stamping process. The LED assembly 16 and the driver board 18 may be manufactured separately. When manufacturing the LED assembly 16, the LED elements 34 and the dam 36 may be provided on the LED board 35 and phosphor material may be filled into the cavity surrounded by the dam 36, covering the LED elements 34 and forming the phosphor coating 37. In case either the LED assembly 16 or the driver board 18 should be defective, it may be sufficient to only replace the defective part 16, 18. On the heat sink 22, the electrical circuit 19 may be mounted using thermal glue by providing the LED assembly 16 and the driver board 18 individually. Mounted on the heat sink 22, metallic pins (not shown) may be coupled to the driver board 18 and may pass through the heat sink 22 to the bottom side thereof. The driver board 18 and the LED assembly 16 may be electrically coupled as one functional unit by ribbon bonds 58. The cylindrical housing part 12 and the back housing part 14 may each be molded in one piece. The plug housing 46 may be formed in one piece with the back housing part 14 which further may comprise holes (not shown) passing to the plug housing 46. The cylindrical housing part 12 and the back housing part 14 may be arranged from opposed directions and coupled via a snap connection formed by the gripper arms 48 and the apertures 44. The metallic pins (not shown) may project through the holes into the plug housing 46, in order to provide an internal electrical connection to which an electrical plug may be coupled.

Figure 8:
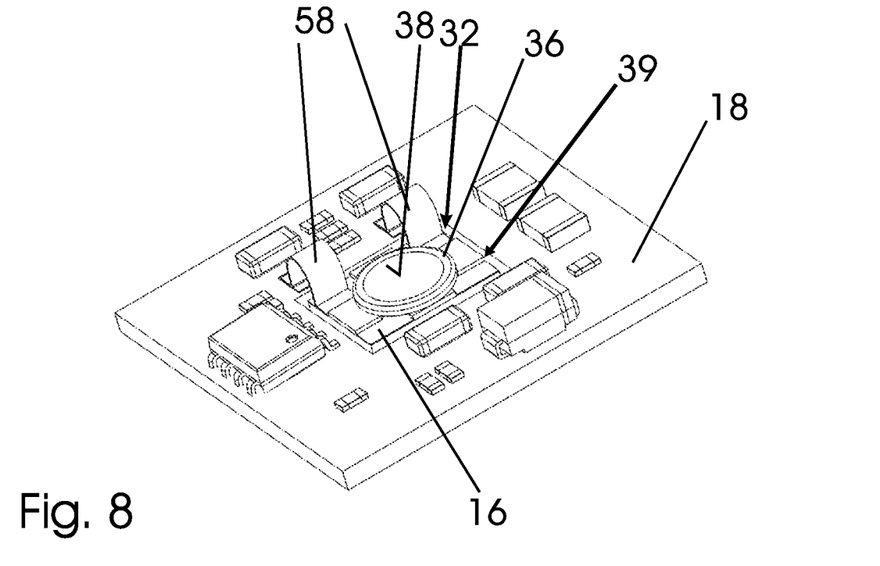
FIG. 8 is a perspective view of an alternative embodiment of boards with an electrical circuit.
Figure 9:
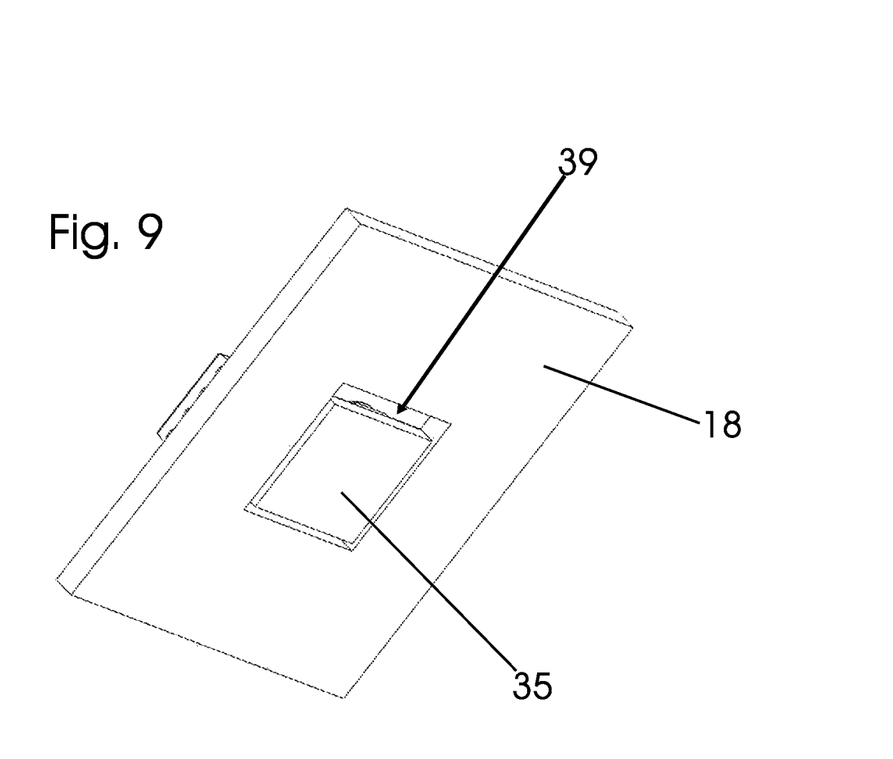
FIG. 9 is a bottom perspective view of the alternative embodiment of boards with an electrical circuit of FIG. 8.

FIGS. 8 and 9 show an electrical circuit 19 according to an alternative embodiment which corresponds to the electrical circuit 19 according to the first embodiment and may differ only in the rectangular shape of the driver board 18.

Figure 10:
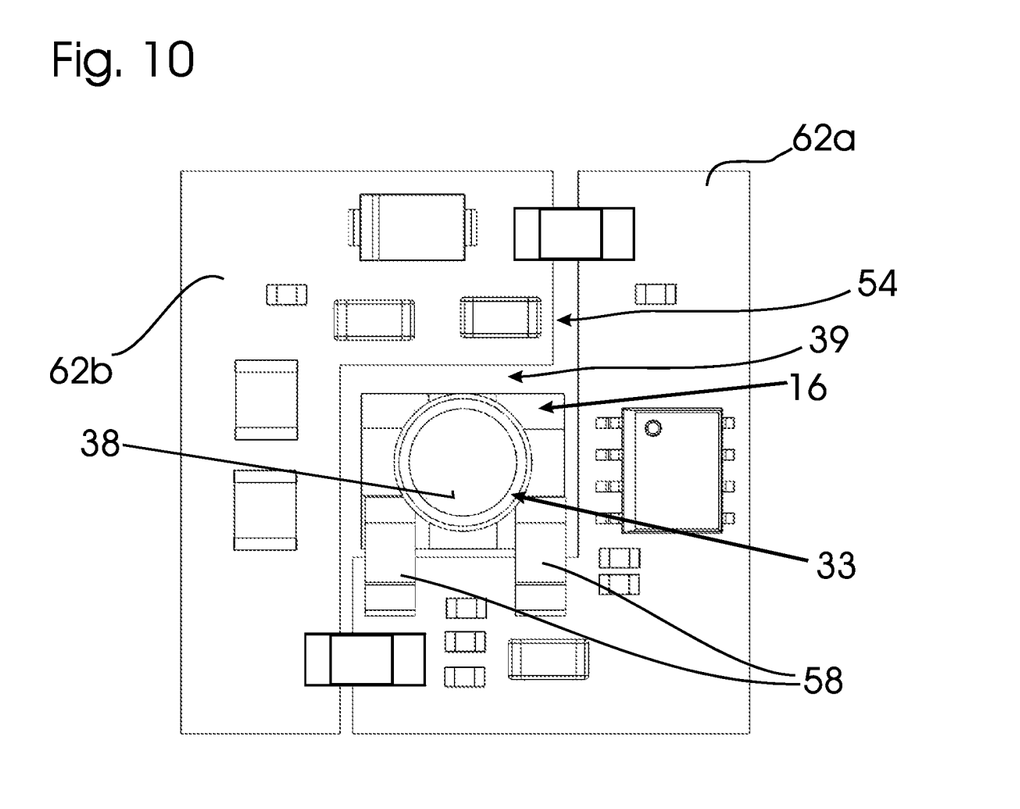
FIG. 10 is a top view of boards with an electrical circuit according to a further alternative embodiment.

FIG. 10 shows an electrical circuit 19 according to a further alternative embodiment. The driver board 18 according to the alternative embodiment may comprise two driver board portions 62a, 62b that are equally L-shaped. Between both driver board portions 62a, 62b may be a gap 54 and, in the middle, a rectangular cutout 39 may be formed wherein the LED assembly 16 may be arranged. Although the driver board portions 62a, 62b may be equally shaped, different electronic components may be mounted thereon. Analogously, the two driver board portions 62a, 62b may be manufactured and mounted on the heat sink 22 separately and electrically coupled by ribbon bonds afterwards, such that they may function as one electrical circuit.

Figure 11:
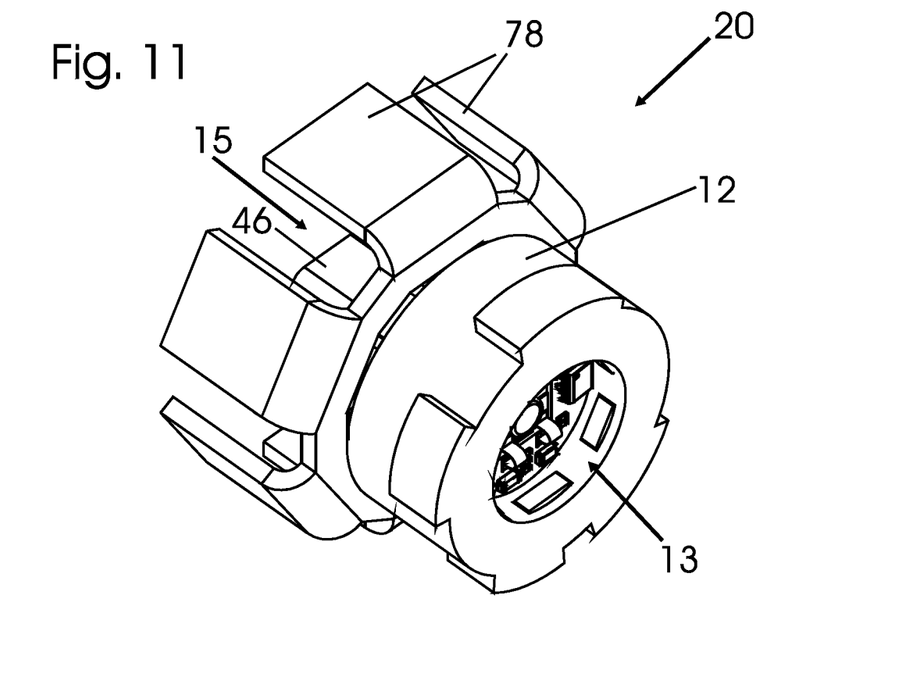
FIG. 11 is a perspective view of a second embodiment of the lighting device.
Figure 12:
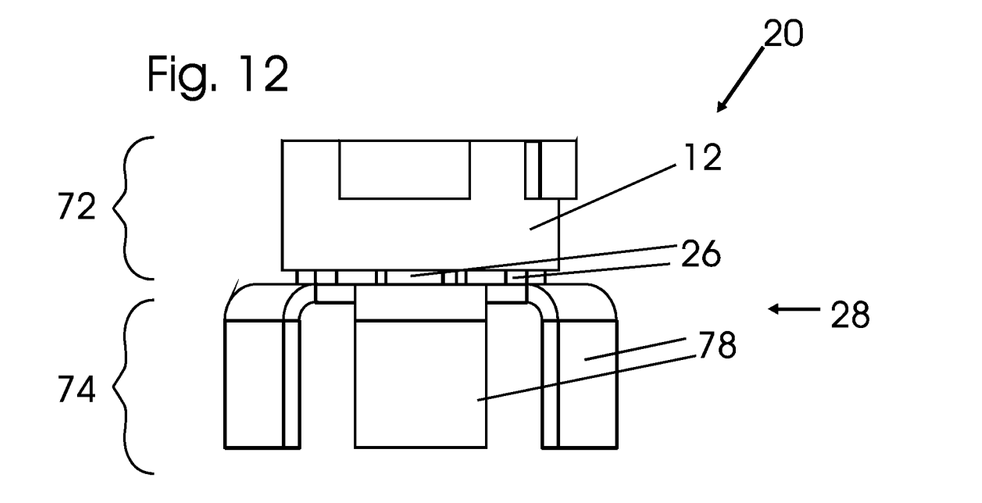
FIG. 12 is a side view of the second embodiment lighting device of FIG. 11.
Figure 13:
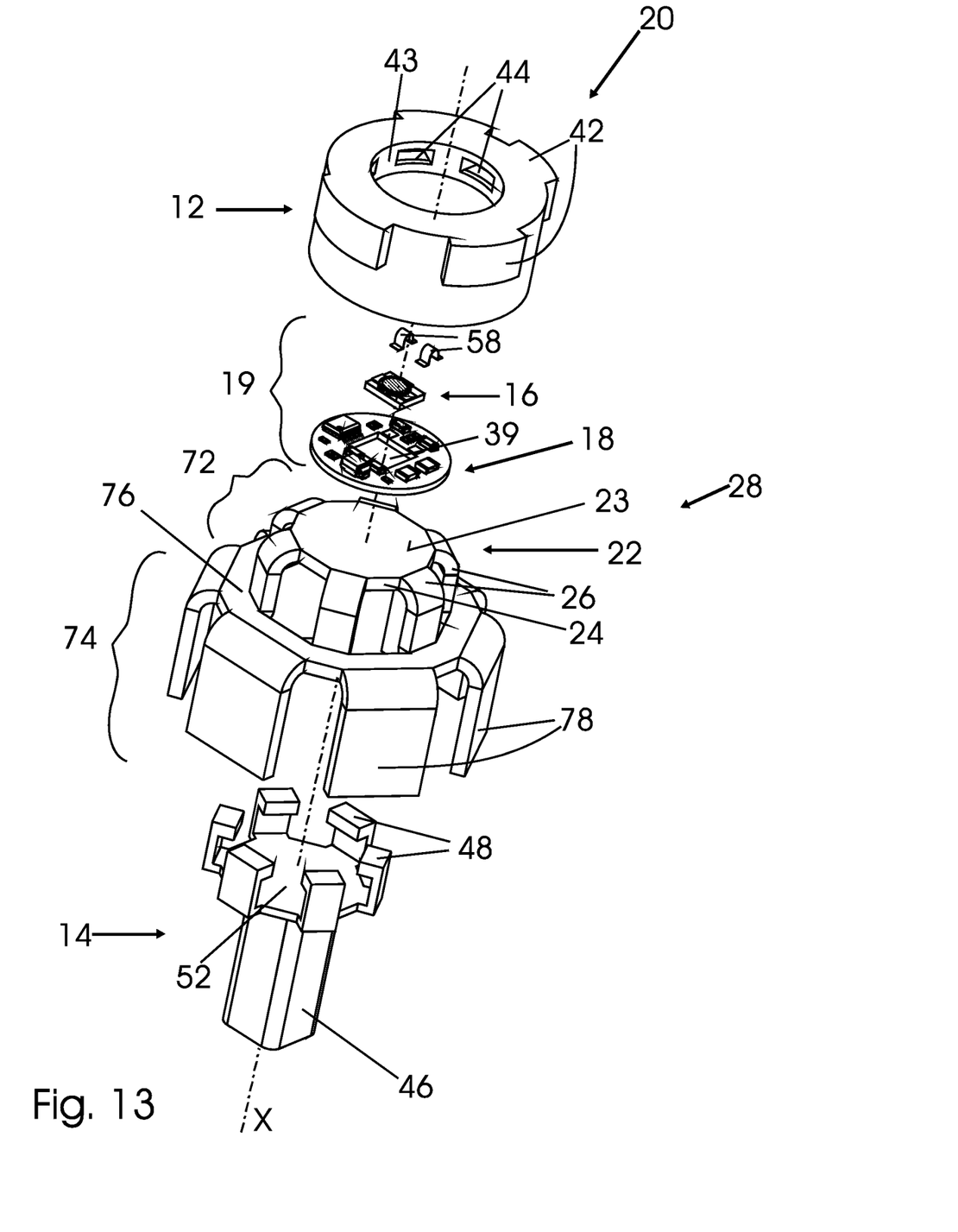
FIG. 13 is an exploded perspective view of the second embodiment lighting device of FIGS. 11, 12.

FIGS. 11-13 show a second embodiment of a lighting device 20 in a perspective view. It corresponds in all components and in the arrangement of the components to the lighting device 10 of the first embodiment, and the same reference signs are used to refer to the same components. The second embodiment may only differ in the shape of the heat sink 28 of the lighting device 20.

The heat sink 28 is shown in FIG. 13. The heat sink 28 may comprise a first and a second heat sink portion 72, 74. The first heat sink portion 72 may comprise first heat fins 26 and a heat sink plate 24 on which the electrical circuit 19 may be mounted. The second heat sink portion 74 may comprise a plane ring 76 and second heat fins 78 which may project from the plane ring 76 into a back direction in parallel to the optical axis X. The heat fins 78 may be separated from each other. The plane ring 76 may act to space apart the first heat fins 26 and the second heat fins 78. The whole heat sink 28 may be manufactured in one piece out of a bent copper or aluminum sheet material.

Figure 14:
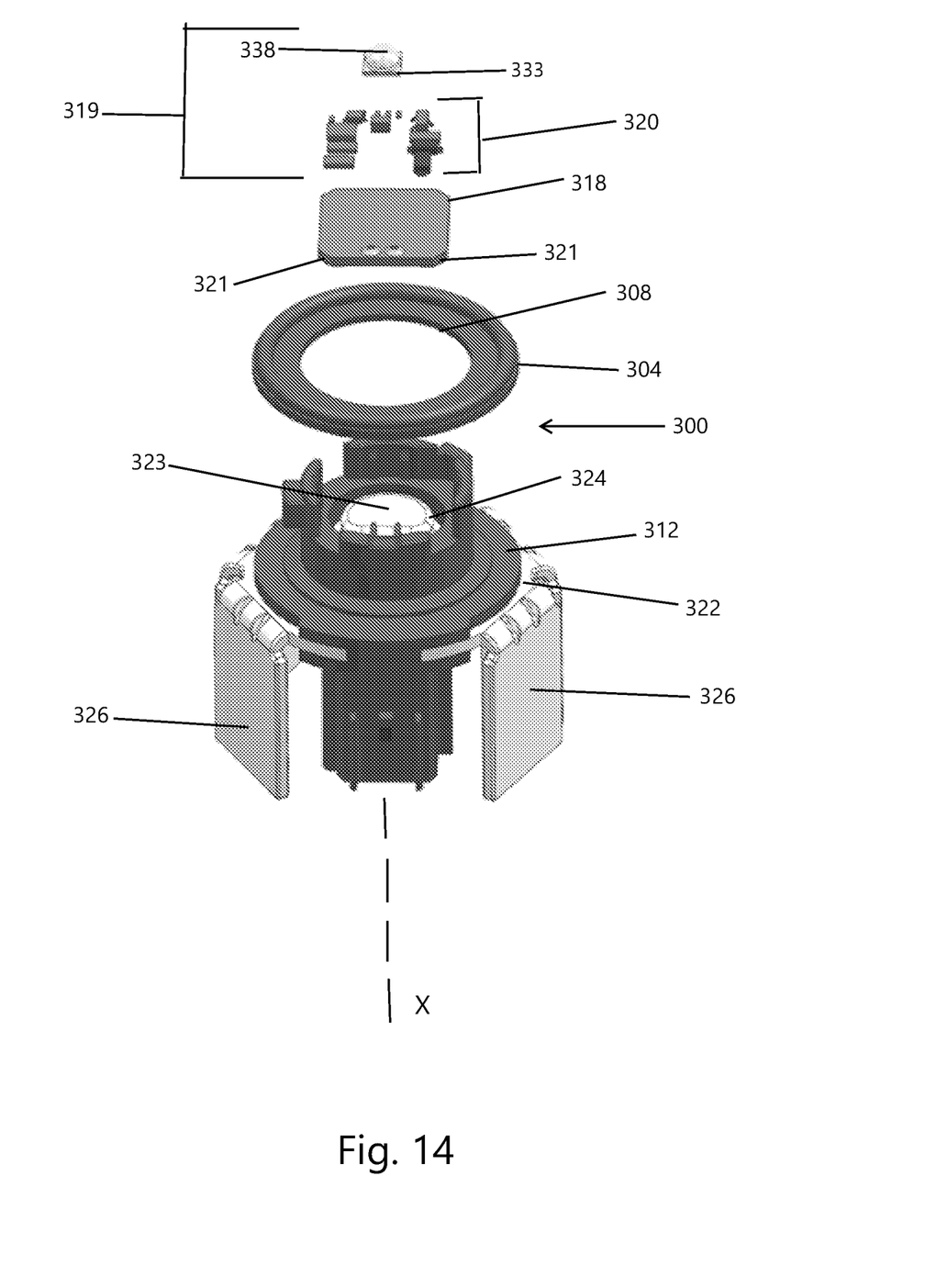
FIG. 14 is an exploded perspective view of a third embodiment lighting device.

FIG. 14 shows a third embodiment of a lighting device 300 in an exploded perspective view. Several of the components of the third embodiment and their arrangement correspond with the lighting device 10 of the first embodiment. The lighting device 300 may comprise a circular gasket 304 having a central aperture 308 that may also be circular in shape, or any other suitable shape. An electrical circuit 319 includes an LED unit 333 and electronic components 320 for driving the LED unit 333. The LED unit 333 is provided with a light emitting surface 338 from which light may be emitted into a forward direction parallel to an optical axis X.

The LED unit 333 may comprise several LED elements (not shown) which may be surrounded by a dam (not shown) and may be covered by a phosphor coating (not shown) which may provide the light emitting surface 338. The dam may also border the phosphor coating.

The lighting device 300 may include a housing portion 312. The housing portion 312 may include a circular opening through which a heat sink 322 may extend. Circularly arranged heat fins 326 may extend from the heat sink 322 and may protrude in a direction parallel to the optical axis X and away from the electrical circuit 319. The heat sink 322 may include a plate portion 324 from which the heat fins 326 extend. The plate portion 324 may be arranged to be perpendicular to the optical axis X. The heat fins 326 may be spaced apart from each other and may provide a free space between each two of the heat fins 326. The plate portion 324 and the heat fins 326 may be formed in one piece out of a bent copper or aluminum sheet material. The plate portion 324 may include at its top a mounting area 323 for mounting the electrical circuit 319.

The electronic components 320, such as a power supply and components for safety, may be mounted to a main board 318 to drive the LED unit 333. Likewise, the LED unit 333 may be arranged for mounting on the main board 318. The main board 318 may be a printed circuit board. The LED unit 333 and the electronic components 320 together form the electrical circuit 319. Thus, under this third embodiment, the LED unit 333 and the electronic components 320 are mounted to the same main board 318.

Often, the LED unit 333 is fabricated utilizing several small chips such as lateral dies, CSP dies, or TF dies, attached to a substrate, and covered by phosphor and/or a silicone lens. The dispensing of phosphor over the chips is often subject to strong process variation, high rates of failure, the need for calibration, and other variables. In the event the LED unit 333 is rejected during manufacture of the lighting device 300, it is less costly to discard the rejected LED unit 333 mounted to the main board 318 before final assembly, as opposed to discarding the LED unit 333 mounted to the heat sink 322 after final assembly. Thus, under certain circumstances, a cost savings can be realized by mounting the LED unit to the main board 318, as opposed to directly to the heat sink 322.

The main board 318 may be shaped to fit through the central aperture 308 of the circular gasket 304 so as to fit within the circular opening of the housing portion 312 and may be mounted on the mounting area 323 of the heat sink 322. For example, the main board 318 may be mounted on the mounting area 323 utilizing a thermal glue. The main board 318 may be generally square or rectangular and may include cut-offs 321 at its corners. Alternatively, the main board 318 may be generally circular or any other suitable geometric shape. The main board 318 may have the same dimensions as the plate portion 324. The heat sink 322 may be manufactured in one piece by a stamping process.

Figure 15:
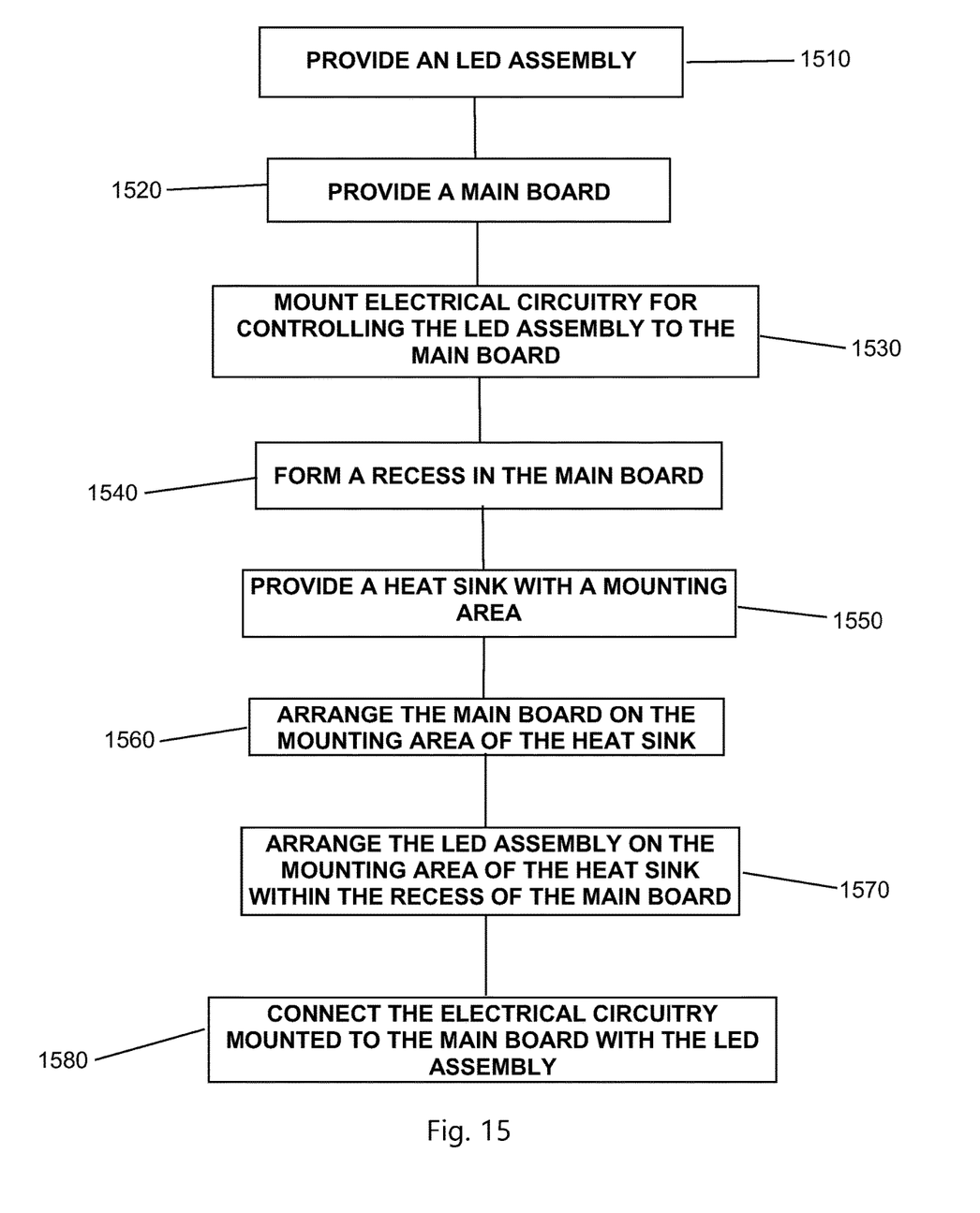
FIG. 15 is a flow diagram illustrating the steps for manufacturing a lighting device.

FIG. 15 is a flow diagram illustrating the steps for manufacturing a lighting device. These manufacturing steps are shown at steps 1510, 1520, 1530, 1540, 1550, 1560, 1570, and 1580. In a first manufacturing step 1510, an LED assembly may be provided. At step 1520, a main board may be provided. At step 1530, electrical circuitry for controlling the LED assembly may be mounted to the main board. At step 1540, a recess may be formed in the main board. At step 1550, a heat sink with a mounting area may be provided. At step 1560, the main board may be arranged on the mounting area of the heat sink. At step 1570, the LED assembly may be arranged on the mounting area of the heat sink within the recess of the main board. At step 1580, the electrical circuitry mounted to the main board may be connected with the LED assembly.

The LED assembly may comprise at least one LED element. The term LED element may be used herein to refer to any type of single solid-state lighting element or group of solid state lighting elements, such as light emitting diodes, laser diodes, organic light emitting diodes (OLED) and the like. The term LED assembly may be used herein to refer to an assembly including, in addition to one or more LED elements, one or more further elements serving, for example, thermal, mechanical, optical and/or electrical functionalities. This may include, for example, electrical connection means, such as connection pads, to electrically contact the LED assembly to, for example, an external power supply. The further elements may also include a base on which the LED element may be mounted. Still further, the LED assembly may comprise a cover covering the LED element, such as an optical element which may be transparent or which may serve to alter the light emitted from the LED element.

The heat sink may be any component that consists of or includes any rigid, thermally conductive material, for example, metal, such as aluminum or copper, to dissipate the heat of electrical components such as the LED assembly. LED elements within the LED assembly may be particularly sensitive to elevated temperatures, such that efficient heat dissipation is preferable.

Besides heat dissipation, the heat sink may serve a mechanical purpose. For example, the heat sink may act as a carrier for the LED assembly. The mounting area may be any part of the heat sink suitable for an LED assembly to be mounted on, or arranged at the top of the heat sink. For example, the mounting area may provide a surface on which electrical components, such as the LED assembly, may be attached easily and reliably.

The lighting device further may comprise a main board with an electrical circuitry disposed to control the LED assembly and an electrical connection provided between the LED assembly and the electrical circuitry.

The main board may serve as a carrier for an electrical circuitry that may be mounted thereon. The main board may be made out of a solid material and may, for example, be a plane board. The main board may be, for example, a board for SMD components. It may be especially preferred that the shape of the main board may be similar to the shape of the mounting area, for example, circular if the mounting area is circular or rectangular if the mounting area is rectangular. The size of the main board may be, for example, such that it fits the mounting area but does not extend beyond it.

The electrical circuitry may be electrically coupled to the LED assembly. For example, the electrical circuitry may supply electrical operating power to the LED assembly. For example, the electrical circuitry may comprise a driver circuit to serve as a power supply for the LED assembly. Moreover, the electrical circuitry may comprise electric components for current regulation and safety. For example, the electrical components may be arranged for protecting electronic circuits against voltage spikes.

The electrical connection provided between the LED assembly and the electrical circuitry may comprise any type of electrical conductor. For example, connection pads and/or connection pins may be provided on the LED assembly and/or on the main board, such that a wire connection may be provided coupling the LED assembly to the electrical circuitry on the main board.

According to the embodiments described, a recess may be provided within the main board, and the LED assembly may be positioned within the recess. The main board thus may provide a free space in which the LED assembly may be at least partially received. The recess may be of different shape, for example, a circle, a rectangle or any shape of a hole or cutout that may be within the main board. It may be preferred that the recess is a cutout within the main board. The recess may be fully surrounded by the main board. For example, the recess may be positioned within a central portion of the main board. Alternatively, the recess may be only partially surrounded by the main board, such as at an outer edge thereof. For example, the recess may surround the LED assembly. Further, the recess may be larger than the LED assembly or the recess may be shaped to conform to the shape of the LED assembly.

Thus, according to the embodiments described, both the main board and the LED assembly may be positioned on the mounting area, and the LED assembly may be arranged within the recess. This may allow both the main board and the LED assembly to be in direct contact with the mounting area of the heat sink to provide superior thermal coupling. The recess within the main board may leave a free space on the mounting area wherein the LED assembly may be positioned. For example, a gap may be provided between the LED assembly and the main board. The main board and the LED assembly may, for example, be thermally coupled to the heat sink by thermal glue or a thermal pad.

The lighting device according to the embodiments described herein thus may flexibly allow an appropriate main board to be combined with a suitable LED assembly. The main board and the LED assembly may advantageously be manufactured separately from each other and may be coupled late in the manufacturing process when mounting on the heat sink. In case of a defect, only the defective part may need to be replaced, for example, only the main board or only the LED assembly. Furthermore, the recess may provide a benefit in that the two separately manufactured parts may both be in contact with the heat sink instead of mounting, for example, the LED assembly on the main board. Hereby, the LED assembly and the main board may be in direct contact with the heat sink, which may optimize the heat dissipation.

In some embodiments, the LED assembly may comprise an LED unit comprising one or more LED elements. The term LED unit may be used herein to refer to a device mounted on a substrate, such as, for example, a circuit board, which may comprise one or more LED elements and may be disposed to emit light from a light emitting surface. In addition, the LED unit may comprise further elements, such as a cover over the LED element. In operation of the LED element(s), light may be emitted from the light emitting surface of the LED unit, which may, for example, be planar and may be of any suitable shape, such as, for example, rectangular or circular. The light from the LED element may be directly emitted from the light emitting surface, or may be modified, such as by optical elements modifying the direction, intensity distribution, color or other properties.

For example, the LED unit may comprise a dam surrounding the LED elements and a phosphor coating arranged to cover the LED elements. The dam may surround the LED elements partially or, for example, completely. It may be preferred that the dam is higher than the LED elements so that the dam protrudes beyond the LED elements in a direction normal to the LED board.

The phosphor coating may be arranged within the cavity created by the dam such that the dam may act as a barrier and as a mold for the phosphor coating. It may be advantageous during the manufacturing process that the dam may border the phosphor coating and define its size. The phosphor coating may, for example, be yellow, green, or red in color.

In some embodiments, the LED assembly may comprise an LED board and an LED unit comprising a light emitting surface. The LED board may be of planar shape. It may provide a plane lower surface disposed to be in contact with the heat sink and a plane upper surface on which the LED unit may be mounted. The board may be, for example, rectangular or circular. A rectangular shape may be preferred to reduce the material waste when manufacturing a plurality of LED boards. The LED assembly may include the LED board, and the LED unit may be realized, for example, as a top contact lateral chip, a bottom contact chip scale package, or a vertical die that is directly deposited on the board.

While generally the size of the LED board and of the LED unit and its light emitting surface may be freely chosen, in some embodiments, a rather small LED board may be used that may be sufficient to accommodate the LED unit but not much larger. Therefore, the LED board, for example, may have a size of less than three times the size of the light emitting surface. For example, the LED board may be 2.5 times or less the size of the light emitting surface of the LED unit. The size of the LED board and the light emitting surface may both be measured as the largest extension in parallel to the light emitting surface, such as the diameter or diagonal.

According to a further embodiment, the main board may be arranged to surround the LED assembly from at least two opposed directions. It may be arranged, for example, in a half circle surrounding the LED assembly or may be angularly shaped. In some embodiments, the main board may surround the LED assembly from all the sides. Surrounding the LED assembly from two opposed sides may allow an arrangement of the light emitting area in the center of the mounting area which may provide optical advantages.

The main board may be provided in one piece. In an embodiment, the main board may comprise or may be composed of a first main board portion and a second main board portion. The first and the second main board portion may be arranged surrounding the LED assembly. For example, the first main board portion may be arranged at one side of the LED assembly and the second main board portion may be arranged at the opposite side of the LED assembly. A composition of the main board of at least two pieces may allow an easy manufacture of the recess. For example, the recess may, for example, be formed by assembling first and second main board portions including a first and a second recess portion. Further, it may allow for an easy manufacture of the main board itself, such as by shaping the first and the second main board portion equally, such that they may be manufactured in one manufacturing step. In case of defective parts within the main board, it may be sufficient to only replace the first or the second main board portion.

In an embodiment, the first main board portion and the second main board portion may have an L-shape. The L-shape may be characterized by two legs that may be arranged under an angle, for example, right-angled. The two legs of each main board portion may have different lengths, or, for example, the same length. It may be further preferred that the two main board portions have the same shape. The first and the second main board portion may be positioned on the mounting area such that the first leg of the first main board portion may be arranged adjacent to one leg of the second main board portion, and the second leg of the first main board portion may be arranged adjacent to the other leg of the second main board portion. The first and the second main board portions may be arranged in contact with each other or with a small gap, such as less than 5 mm. By positioning the main board portions in this way, they may enclose a rectangular shaped recess. Thus, the recess may be formed by arranging L-shaped main board portions in an appropriate manner instead of cutting material out of the main board.

L-shaped main board portions may be easy to fabricate during the manufacturing process due to their rectangular shape. Additionally, they may be cut out in one manufacturing step if they have the same L-shape. Furthermore, the recess may be easily provided by positioning both main board portions adjacent to each other. Additionally, the rectangular recess allows for the manufacture of a fitting rectangular LED assembly which is easy to manufacture and minimizes material waste.

The LED assembly may be arranged within the recess such that it may be in direct mechanical contact with the main board or at a distance thereto. According to an embodiment, the main board and the LED assembly may be arranged forming a gap of 10-500 µm, 20-200 µm, and/or 30-100 µm. The gap may, for example, be formed along one edge, several edges, or all edges of the LED assembly. The small gap may allow for a compact design of the main board and the LED assembly. Further, the small gap may be advantageous for the electrical connection between the main board and the LED assembly by providing a short connection path. A longer connection path may increase the possibility for failures, such as cable ruptures.

In some embodiments, the mounting area may be a plane portion, and the heat sink may comprise heat fins protruding from and forming an angle with the mounting area. The plane portion may be, for example, a plate made out of an appropriate heat sink material, such as a sheet metal.

The heat fins may be provided to provide an increased surface to dissipate heat. The heat fins may be directly coupled to the mounting area, for example, forming one piece therewith. The heat fins may protrude in a backwards direction, for example, opposed to a forward direction defined by the central light emission direction, which, for example, may be in a direction normal to the mounting area. The heat fins may, for example, be arranged at least substantially at right angles with respect to the mounting area. The mounting area and the heat fins may be made from bent sheet metal material.

According to a further embodiment, the plane portion of the heat sink may be a first plane portion, and the heat sink may further comprise a second plane portion arranged in parallel to the first plane portion. The heat fins may be first heat fins, and the heat sink may further comprise second heat fins protruding from and forming an angle with the second plane portion. The second plane portion may be a plane area, such as in the shape of a ring or a polygon. The second plane portion may, for example, extend beyond the first plane portion in a direction parallel to the plane portion. For example, the second plane portion may have an outer diameter larger than the outer diameter of the first plane portion in order to increase the size of the heat sink and consequently provide better heat dissipation. Especially preferred, the first heat fins may be attached to the second plane portion, too, such that the first heat fins may be arranged to couple the first and the second plane portion. For example, the heat sink including the first and second plane portions and first and second heat fins may be formed in one piece, for example, from bent sheet metal material.

In further embodiments, a housing may be arranged to cover the heat sink, the main board, and the LED assembly at least partially. The housing may comprise a first and a second housing part. At least a portion of the heat sink may be arranged between the first and the second housing part. The housing may consist of any solid material, for example, an electrically insulating material, such as a plastic material. It may be advantageous that the housing covers at least a portion of the main board, without covering the light emitting surface, such that electrical circuitry may be protected from environmental influences, such as humidity or pollution. It may be especially preferred that the housing provides features, for example a ring-shaped surface, for supporting a sealing, such as an O-ring.

Partitioning the housing into two parts may facilitate the arrangement of the housing, such that there is no need, for example, to overmold the components. The first part of the housing may be arranged from one side of the heat sink and the second part may be arranged from, for example, the opposite side, such that the heat sink may be arranged in between. Manufacturing and arranging the housing in two separate steps may especially be advantageous to avoid impact of a high temperature process on electronic components.

According to some embodiments, the first housing part may comprise a first locking feature and the second housing part may comprise a second locking feature. The first and the second locking feature may be fixed together. The first locking feature may be arranged in a free area between two heat fins. The first and second locking feature may be fixed together, such that the attachment may be detachable or permanent. For example, the locking features may form a snap connection, or the first locking feature may be fixed to the second locking feature by clamping, such as in between of two clamping parts, or the first locking feature may be an aperture and the second locking feature may be a lug that may fit into the aperture. The first and the second locking feature may alternatively be fixed together by an adhesive medium or screws.

The first locking feature may, for example, comprise an elongated portion such that a leg may be formed. A leg may provide an advantageous shape in order to be arranged between two heat fins. In some embodiments, the first and/or the second housing part may comprise a plurality of locking features, for example, the first housing part may comprise a plurality of separate legs.

The heat fins may be spaced apart from each other such that a plurality of free areas may be provided and a plurality of the first locking features may extend through these free areas. For example, the distances between each two neighboring heat fins may be the same. For example, between each two heat fins a leg of the first locking feature may be arranged.

According to an embodiment, the housing may provide an electrical plug housing. The plug housing may be suitable to receive an electrical connector in order to couple to an external power supply. It may be advantageous that the plug housing may be made of an insulating material, such as a plastic material. The plug housing may comprise a cavity within the housing. For example, the housing and the plug housing may be manufactured in one piece. The plug housing may be arranged orthogonal to the mounting area, such that connections pins of a plug connector may be directed at the mounting area. The plug housing may be disposed to receive an internal electrical connection. For example, one or more electrical conductors such as pins or a lead frame may extend from the plug housing to the mounting area in order to be electrically coupled to the electrical circuitry. It may be especially preferred that the plug housing may comprise a locking mechanism, such that the electrical connector may be reliably held.

The housing may provide alignment features for an arrangement relative to a holder. The alignment features may, for example, be provided to ensure a defined alignment of the lighting device relative to the holder. The alignment features may comprise an alignment surface, alignment protrusion and/or an alignment indentation that are disposed to engage with a corresponding alignment surface, alignment protrusion and/or indentation of the holder. It may be especially preferred that the housing and the alignment protrusion and/or indentation may be made in one piece in order ensure exact positioning.

The electrical circuitry may, for example, be disposed to be contacted to an external power supply via the internal electrical connection, for example, passing through or around the heat sink to the plug housing. The internal electrical connection may comprise metallic pins which may be coupled to the main board situated on the mounting area and which may, for example, pass through the heat sink to the bottom side of the heat sink. The internal electrical connection or, for example, the heat sink may be electrically isolated, for example, by anodizing the heat sink. In order to provide the housing, the heat sink and the electrical circuitry may be overmolded and within this manufacturing step the plug housing may be formed on the bottom side of the heat sink, such that the metallic pins project into the plug housing serving as electrical connection means for the electrical connector.

As an alternative to overmolding the heat sink and the electrical circuitry, the housing may, for example, be composed of two or more housing parts which are arranged to cover the heat sink, such that they may form the housing when being fixed together. In some embodiments, one of the housing parts may comprise the plug housing and holes through which the metallic pins may pass, such that they end inside the plug housing.

The electrical connection provided between the electrical circuitry and the LED assembly may, for example, be established late in the manufacturing process. Therefore, the electrical connection may be realized by wire bonding or ribbon bonding. Ribbon bonds provided to couple the LED assembly to the electrical circuitry on the main board may, for example, consist of gold or aluminum. They may be contacted such as to contact pads or pins.

It should be noted that the above-mentioned embodiments illustrate rather than limit the invention, and that those skilled in the art will be able to design many alternative embodiments without departing from the scope of the appended claims. For example, in addition to the electrical circuit 19 mounted on the top surface 23 of the plate portion 24, a second electrical circuit may be mounted on the bottom surface thereof.

It is to be understood that the presentation of embodiments set forth above is merely exemplary and non-limiting.

Other features will become apparent from this detailed description considered in conjunction with the accompanying drawings. It is to be understood, however, that the drawings are designed solely for purposes of illustration and are not limiting. It should be further understood that the drawings are not drawn to scale and that they are merely intended to conceptually illustrate the structures and procedures described herein.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:
1. A lighting device comprising:
a heat sink comprising a mounting area;

a main board mounted to the mounting area of the heat sink, the main board comprising a top surface and a recess as a cutout which may serve to provide a free area for a light-emitting diode (LED) assembly, wherein the light-emitting diode (LED) assembly is mounted to the mounting area within the recess of the main board, the LED assembly completely exposed from the top surface of the main board, the LED assembly comprising at least one emitter and spaced apart from inside surfaces of the main board within the recess and forming a gap between 10-500 μm;

an electrical circuit disposed on the top surface of the main board, the electrical circuit configured to control the at least one emitter of the LED assembly; and an electrical connection provided between the LED assembly and the electrical circuit via an electrical conductor.

2. The lighting device of claim 1, wherein the shape of the recess is analogous to the shape of the LED assembly.

3. The lighting device of claim 1, wherein the shape of the recess is rectangular, and the shape of the LED assembly is rectangular.

4. The lighting device of claim 1, wherein the LED assembly is surrounded from at least two directions by the main board and being situated in a center.

5. The lighting device of claim 1, wherein the electrical connection between the LED assembly and the electrical circuit comprises ribbon bonds.

6. The lighting device of claim 5, wherein the ribbon bonds bridge the gap separating the main board and the LED assembly.

7. The lighting device of claim 1, wherein the LED assembly comprises an LED unit including one or more LED elements, the LED assembly additionally comprising a dam surrounding the LED elements, and wherein a phosphor coating is arranged to cover the LED elements.

8. The lighting device of claim 1, wherein the main board comprises a first main board portion and a second main board portion.

9. The lighting device of claim 8, wherein the first main board portion and the second main board portion each have an L-shape.

10. The lighting device of claim 9, wherein between the first main board portion and the second main board portion is a rectangular cutout arranged to receive the LED assembly.

11. The lighting device of claim 1, wherein the mounting area is a plane portion, and wherein the heat sink comprises heat fins protruding from and forming an angle with the mounting area.

12. The lighting device of claim 11, wherein the plane portion is a first plane portion and the heat sink further comprises a second plane portion being arranged in parallel to the first plane portion, and wherein the heat fins are first heat fins, and the heat sink further comprises second heat fins protruding from and forming an angle with the second plane portion.

13. The lighting device of claim 1, further comprising a housing arranged to cover the heat sink, the main board, and the LED assembly at least partially, wherein the housing comprises a first housing part and a second housing part, and wherein at least a portion of the heat sink is arranged between the first housing part and the second housing part.

14. The lighting device of claim 13, wherein the first housing part comprises a first locking feature and the second housing part comprises a second locking feature, wherein the first locking feature and the second locking feature are fixed together.

15. The lighting device of claim 13, wherein the housing provides an electrical plug housing.

16. The lighting device of claim 13, wherein the housing provides alignment features for an arrangement relative to a holder.

17. A method of manufacturing a lighting device, comprising the steps of:

providing an LED assembly;

providing a main board comprising an electrical circuit to control the LED assembly, the main board comprising a recess as a cutout which may serve to provide a free area for a light-emitting diode (LED) assembly;

providing a heat sink with a mounting area;

arranging the LED assembly and the main board on the mounting area, wherein the LED assembly is arranged within the recess and spaced apart from inside surfaces of the main board within the recess and forming a gap between 10-500 μm with the LED assembly completely exposed from the top surface of the main board; and electrically connecting the LED assembly with the electrical circuit via an electrical conductor.

18. An automotive lighting system comprising:

a lighting device comprising:

a heat sink comprising a mounting area;

a main board mounted to the mounting area of the heat sink, the main board comprising a top surface and a recess as a cutout which may serve to provide a free area for a light-emitting diode (LED) assembly, wherein the light-emitting diode (LED) assembly is mounted to the mounting area within the recess of the main board, the LED assembly completely exposed from the top surface of the main board, the LED assembly comprising at least one emitter and spaced apart from inside surfaces of the main board within the recess and forming a gap between 10-500 μm;

an electrical circuit disposed on the top surface of the main board, the electrical circuit configured to control the at least one emitter of the LED assembly, an electrical connection provided between the LED assembly and the electrical circuit via an electrical conductor, and a first housing portion comprising an electrical plug housing electrically coupled to the main board and exposed from a bottom surface of the first housing portion; and a plug connector electrically coupled to the plug housing.

19. The system of claim 18, wherein:

the heat sink comprises a plurality of fins separated apart to form spaces and bent away from the mounting area of the heat sink, the plug connector comprises a plurality of gripper arms spaced apart from one another, and the gripper arms of the plug connector extend through the spaces between the fins and engage openings in a second housing portion.

20. The system of claim 19, wherein the heatsink is a single metal part including the mounting area and the fins.

* * * * *